United States Patent [19]

Kice

[11] 4,183,705

[45] Jan. 15, 1980

[54] RECIPROCATING AIRLOCK VALVE

[75] Inventor: John E. Kice, Wichita, Kans.

[73] Assignee: K-B Engineering Co., Wichita, Kans.

[21] Appl. No.: 869,530

[22] Filed: Jan. 16, 1978

[51] Int. Cl.$^2$ ............................................... F27B 3/18
[52] U.S. Cl. .............................. 414/221; 137/614.11; 222/448
[58] Field of Search .................... 214/17 B, 35 R, 36, 214/37; 137/614.11; 251/628, 630.19; 222/448, 504, 446, 450

[56] References Cited

U.S. PATENT DOCUMENTS

| | | | |
|---|---|---|---|
| 1,369,649 | 2/1921 | Gieseler | 214/17 B |
| 2,408,945 | 10/1946 | Mohr, Jr. et al. | 214/36 X |
| 2,606,672 | 8/1952 | Avery | 214/37 |
| 3,128,915 | 4/1964 | Matter | 222/448 X |
| 3,606,040 | 9/1971 | Euteneuer | 214/37 |
| 3,633,897 | 1/1972 | Vogel | 214/37 X |

Primary Examiner—Albert J. Makay
Attorney, Agent, or Firm—John H. Widdowson

[57] ABSTRACT

A reciprocating airlock valve used in the transfer of granular and powdered stock between two operations and the maintenance of a pressure differential therebetween. The airlock valve designed to maintain an air seal between the two operations while providing continuous material flow through the valve.

4 Claims, 6 Drawing Figures

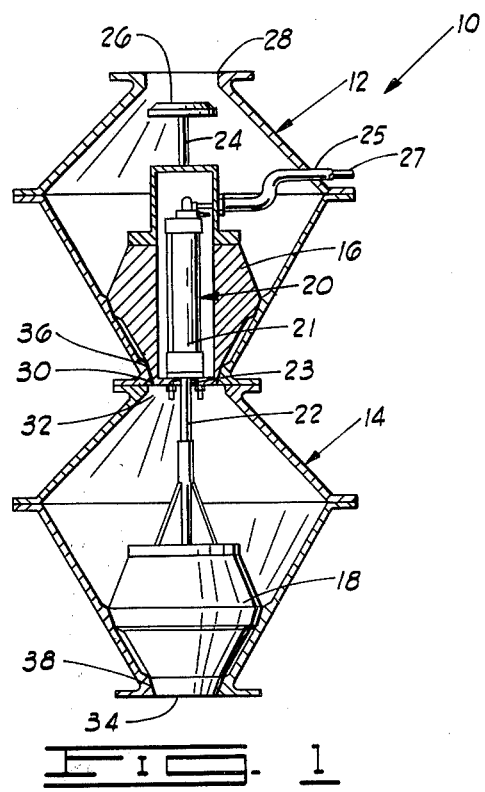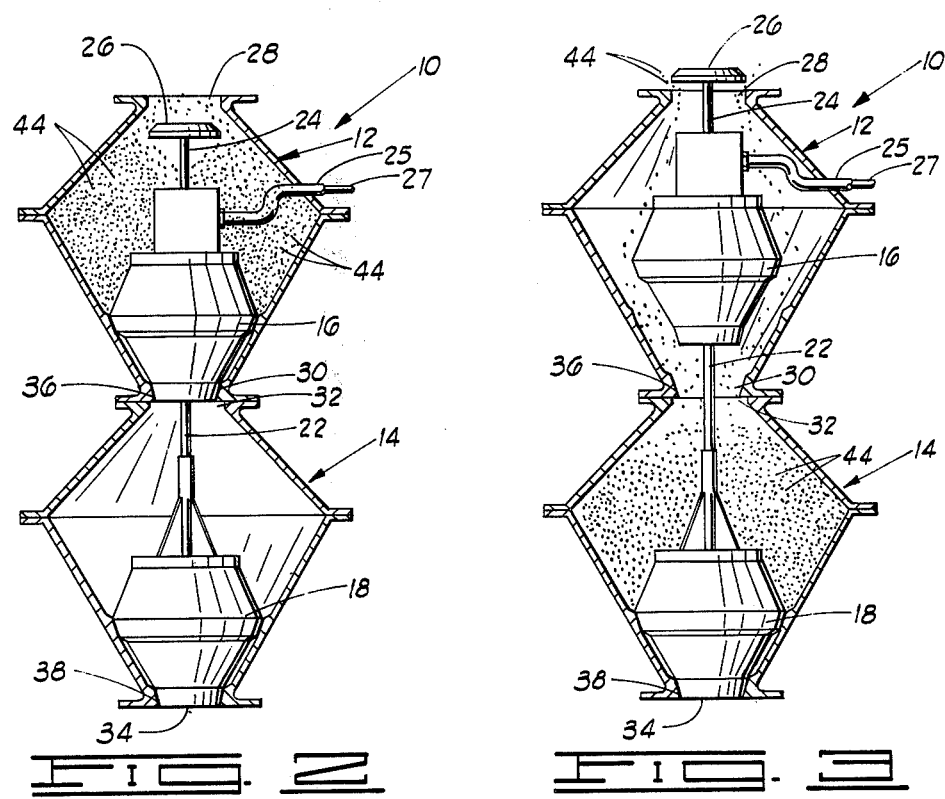

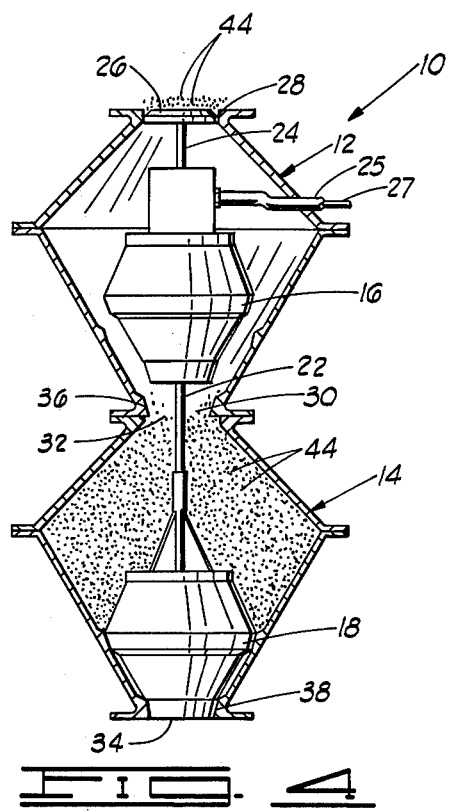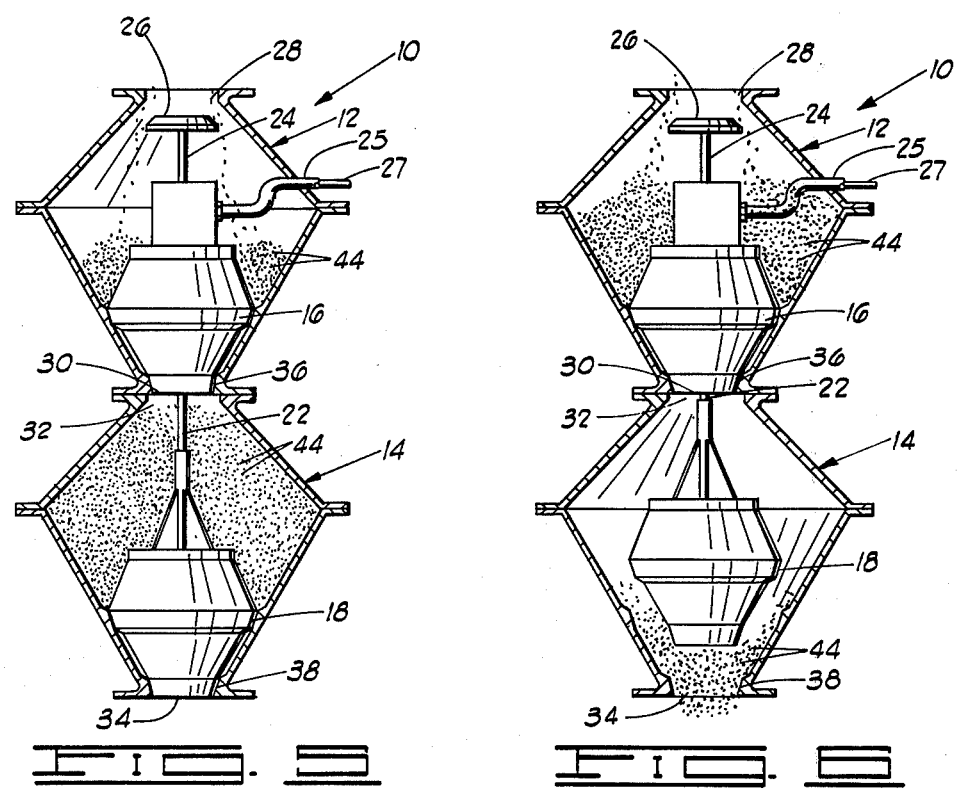

RECIPROCATING AIRLOCK VALVE

BACKGROUND OF THE INVENTION

The subject invention relates generally to valves used in transferring granular and powdered stock and more particularly, but not by way of limitation, to an airlock valve which provides for transferring of the stock between two operations and maintaining a pressure differential therebetween.

Heretofore, two common types of airlock valves have been used in the transferring of granular and powdered stock which maintain a seal between two operations having different pressures. The most common type of airlock valve used in material handling of this type is a rotary vane airlock valve. This type of valve is satisfactory in most cases except for the handling of abrasive materials.

When handling abrasive materials (such as sand, powdered clay, and various types of crushed ore), a flap valve or gate-lock valve is used. These types of valves involve a greater initial expense because of their inherent complexity and greater maintenance cost because of worn and broken replacement parts caused by the jamming of the valve. The flap-type valve requires two trap doors, one below the other. These doors are synchronized to alternately open and close allowing material to drop through from one chamber to the next. The driving mechanism of these type valves is mounted outside the stock chambers and require shafts to pass through the enclosed walls of the chambers with bearings to support the shaft and rotary seals to seal the shafts. The shafts are connected to a drive linkage with counter weights or springs and a driver. This construction with its moving parts is subject to wear, especially the seals and bearings which are in contact with the abrasive dust from the stock. Also, the upper door must try to seal against a continuous flow of material since there is no provision for shutting off the flow into the upper chamber.

Another limitation inherent to the design of the flap-type valves is caused by the large door area compared to the area of flow. This area must be large to allow sufficient material flow. However, this limits the practical pressure differential that the valves can work since the doors have to open against the force created by the pressure multiplied by the area of the opening. To open against high pressure differentials would require extremely heavy drive components. This limitation has been overcome by stage opening or having two doors on one gate. The smaller of the two doors open first to relieve the pressure or vacuum on one side of the door prior to allowing the larger door to open. However, increases in initial expense and maintenance of extra moving parts are involved when a staged opening device is used at higher differentials.

The subject invention eliminates several problems related to the use of the above described flap valve or gate-lock valves.

SUMMARY OF THE INVENTION

The subject invention reduces the initial cost and maintenance cost or prior art valve used in conveying granular and powdered stock while maintaining a pressure differential therebetween.

The invention is simple in design, rugged in construction, and eliminates the use of complex two stage doors such as a gate-lock valve and will handle both abrasive and nonabrasive stocks. The reciprocating airlock valve provides an improved flow rate through a smaller outlet caused by the motion of first and second plugs through the stock, thus activating the stock.

The valve has fewer moving parts, wear points, and sealing problems as opposed to the prior art stock valves. The reciprocating airlock valve insures a positive seal with less tendency to jam while in operation and during system start up. The valve automatically relieves excess pressure in the system and is totally enclosed eliminating failure due to abrasives working on moving parts. Because of the direct application of forces, less power is required to operate the airlock valve.

The reciprocating airlock valve used in the transfer of stock between two operations and the maintenance of a pressure differential therebetween includes an upper hopper having a first inlet port for receiving stock therein and a second outlet port for discharging the stock therethrough. A lower hopper is attached to the bottom of the upper hopper and includes a second inlet port indexed with the first outlet port of the upper hopper. The lower hopper further includes a second outlet port in the bottom thereof for discharging the stock therefrom. A first plug is disposed inside the upper hopper. The lower portion of the first plug is received in the first outlet port and acts to hold in the stock and seal out pressure. A second plug is disposed inside the lower hopper. The lower portion of the second plug is received in the second outlet port of the lower hopper and acts to hold in the stock and seal out pressure. An air motor is disposed in the first plug and includes an air cylinder and an air cylinder rod extending downwardly therefrom and connected to the top of the second plug. When the air motor is activated, it reciprocates the first plug and second plug continuously, thereby raising and lowering the first plug and second plug in the hoppers and thus transferring stock from the upper hopper to the lower hopper and then out of the valve. A stopper is attached to the top of the first plug and is dimensioned to be received in the first inlet port of the upper hopper. This stopper provides a means for momentarily shutting off the flow of stock to the upper hopper, thus allowing the upper plug to seat without interference from the stock.

The advantages and objects of the invention will become evident from the following detailed description when read in conjunction with the accompanying drawings which illustrate the preferred embodiments of the invention.

BRIEF DESCRIPTION OF THE DRAWINGS

FIG. 1 illustrates a cross section of the upper hopper attached to the top of the lower hopper with a cross section of the first plug and the air motor mounted therein.

FIGS. 2 through 6 illustrate the cycle of the airlock valve as the first plug and second plug are raised and lowered in the upper and lower hopper for discharging granular or powdered stock between two operations located at opposite ends of the hoppers.

DETAILED DESCRIPTION OF THE DRAWINGS

In FIG. 1, the reciprocating airlock valve is designated by general reference numeral 10. The purpose of the valve 10 is to maintain a pressure differential between two operations located at the opposite ends or between an operation and atmosphere while allowing flow of granular or powdered stock through the valve 10. For example, this type valve would be used in the emptying of large bins in grain elevators, processing plants, mining and milling operations, and road construction. The valve 10 includes an upper hopper 12 attached to the top of a lower hopper 14. Disposed inside the upper hopper 12 is a first plug 16 shown in cross section. A second plug 18 is disposed inside the lower hopper 14. A continuously reciprocating air motor 20 is mounted inside the first plug 16 and includes an air cylinder 21 and cylinder rod 22 vertically disposed. The rod 22 extends downwardly into the lower hopper 14 and is attached to the top of the second plug 18. Attached to the bottom of the cylinder 21 and disposed around the rod 22 is a rod wiper 23 for wiping abrasive dust and the like from the rod 22 as it reciprocates in the valve 10. The motor 20 further includes an air pressure hose 25 and exhaust hose 27 which are attached to the top of the motor 20 and extend outwardly through the side of the hopper 12 and are connected to a compressed air source which is not shown. A stopper rod 24 having a stopper 26 mounted on top thereof is attached to the top of the first plug 16.

The upper hopper 12 includes a first inlet port 28 disposed in the top thereof. A first outlet port 30 is disposed in the bottom of the upper hopper 12. The first inlet port 28 receives stock therein while the first outlet port discharges the stock into the lower hopper 14.

The lower hopper 14 includes a second inlet port 32 which is indexed with the first outlet port 30 for receiving the stock from the upper hopper 12. A second outlet port 34 is disposed in the bottom of the lower hopper 14. Disposed around the lower portion of the upper hopper 12 is a first plug seat 36 for receiving the lower portion of the first plug 16 therearound. The lower portion of the lower hopper 14 includes a second plug seat 38 for receiving the lower portion of the second plug 18 therearound.

In FIGS. 2 through 6, the reciprocating airlock valve 10 operating cycle is illustrated. In operation, compressed air is fed through the pressure hose 25 to the air motor 20 with the air exhausted through exhaust hose 27. The air motor 20 includes a four-way valve mounted on the top of the cylinder 21 with poppet valves mounted at each end of the cylinder 21 to signal the four-way valve to change directions. Therefore, the air pressure goes to one end or the other of the cylinder 21 at all times while the opposite end is being exhausted causing continuous reciprocation of the air motor 20. The four-way valves are mounted on top of the cylinder 21 and the poppet valves are disposed inside the air motor 20 and are not shown in the drawings.

The air cylinder rod 22 is partially extended in FIG. 2 and the upper hopper 12 is shown receiving stock through the first inlet port 28. The stock is represented by a plurality of fine dots 44. The first plug 16 and second plug 18 are both shown seated in the first plug seat 36 and second plug seat 38 and sealing the first outlet port 30 and second outlet port 34.

As the cylinder rod 22 continues extending, the first plug 16 is raised above the first plug seat 36. At this point, the entire weight of th first plug 16 including the weight of the air motor 20 is transferred to the second plug 18 thus creating a gravitational force to aid in maintaining a seal around the second outlet port 34. As the first plug 16 continues to raise, the stock 44 is discharged through the first outlet port 30 and the second inlet port 32 into the lower hopper 14. FIG. 3 shows the air cylinder rod 22 completely extended and the stock 44 discharged from the upper hopper 12 into the lower hopper 14. The first plug 16 is in its raised position with the stopper 26 extended through the first inlet port 28. It should be noted that the timing of the raising and lowering of the first plug 16 and second plug 18 are controlled by adjusting the air flow rate to the air motor 20.

In FIG. 4, the purpose of the stopper 26 is illustrated. The stopper 26 has the same dimension as the first inlet port 28 so that the stopper 26 provides a seal when it is received in the first inlet port 28. As the rod 22 begins to retract and the first plug 16 is being lowered into the first plug seat 36, the stopper 26 will temporarily block the continuous flow of the stock 44 into the upper hopper 12. This momentary flow stoppage will allow sufficient time for the first plug 16 to seat itself securely in the first plug seat 36 without interference. As the first plug 16 is lowered, the stopper 26 continues downward through the first inlet port 28 into its lowered position shown in FIG. 5. The upper hopper 12 now begins to receive the stock 44 through the first inlet port 28.

In FIG. 5, the air cylinder rod 22 is partially extended. However, the rod 22 is being retracted rather than extended, thus raising the second plug 18 and allowing the stock 44 to be discharged from the lower hopper 14 as shown in FIG. 6. As the cylinder rod 22 continues to be retracted, the weight of the second plug 18 is transferred to the cylinder rod 22 and the first plug 16, thereby providing a gravitational force on the first plug 16 and helping maintain a seal around the first outlet port 30.

In FIG. 6, the lower hopper 14 is emptying and the upper hopper 12 is being filled with the stock 44. As the cylinder rod 22 is completely retracted and reverses its direction into an extended position, the second plug 18 will again be lowered in the empty lower hopper 14 and the second plug 18 will again be seated above the second outlet port 34, as shown in FIG. 2. The operating cycle of the airlock valve 10 is now repeated.

From reviewing the above-described figures, it can be seen that there is always a seal at either the first discharge port 30 or the second discharge port 34, thereby maintaining a pressure differential between the stock received through the first intake port 28 and the operation receiving the stock from the second discharge port 34 while accommodating stock flow through the first hopper 12 and second hopper 14.

While the air motor 20 is shown mounted in the first plug 16, it should be appreciated that the air motor 20 could also be mounted in the second plug 18 and the operating cycle of the valve 10 could be accomplished equally as well as discussed under FIGS. 2 through 6.

Changes may be made in the construction and arrangement of the parts or elements of the embodiment as disclosed herein without departing from the spirit or scope of the invention as defined in the following claims.

I claim:

1. A reciprocating airlock valve used in transferring of granular and powdered stock between two operations and maintaining a pressure differential therebetween, the valve comprising:

an upper hopper having a first inlet port for receiving stock therein and a first outlet port for discharging the stock therethrough;

a lower hopper attached to the bottom of said upper hopper and having a second inlet port indexed with the first outlet port of said upper hopper for receiving the stock from said upper hopper, and a second outlet port for discharging the stock therefrom;

a first plug disposed inside said upper hopper, the lower portion of said first plug received in the first outlet port for providing a seal;

a second plug disposed inside said lower hopper, the lower portion of said second plug received in the second outlet port of said lower hopper and providing a seal;

reciprocating means disposed inside said upper plug and connected to said lower plug for raising and lowering said first plug and said second plug in said upper hopper and said lower hopper, said reciprocating means comprising a fluid operated motor having a fluid cylinder with a fluid operated cylinder rod extending therefrom having means connecting same in operating relation to said first and said second plug; and a stopper extending upwardly from the top of said upper plug and dimensioned to be received in the first inlet port of said upper hopper and providing a seal when said first plug is raised and lowered in said upper hopper by said reciprocating means.

2. The valve as described in claim 1 wherein said reciprocating means is an air motor received in said first plug and having an air cylinder with an air cylinder rod extending downwardly therefrom and connected to the top of said second plug.

3. The valve as described in claim 2 further including a rod wiper attached to the bottom of said first plug and disposed around said air cylinder rod.

4. A reciprocating airlock valve used in transferring of granular and powdered stock between two operations and maintaining a pressure differential therebetween, the valve comprising:

an upper hopper having a first inlet port in the top thereof for receiving stock therein and a first outlet port in the bottom thereof for discharging the stock therethrough;

a lower hopper attached to the bottom of said upper hopper and having a second inlet port in the top thereof and indexed with the first outlet port of said upper hopper for receiving the stock from the upper hopper, and a second outlet port in the bottom thereof for discharging the stock therefrom;

a first plug disposed inside said upper hopper, the lower portion of said first plug received in the first outlet port and seating therein for providing a seal;

a second plug disposed inside said lower hopper, the lower portion of said second plug received in the second outlet port and seating therein for providing a seal;

a reciprocating air motor housed in said first plug and vertically disposed, said air motor having an air cylinder and an air cylinder rod extending downwardly therefrom and connected to the top of said second plug, said air motor when actuated raising and lowering said first plug and said second plug in said upper hopper and said lower hopper; and a stopper mounted on top of a stopper rod, said stopper rod attached to the top of said first plug, said stopper dimensioned to be received in the first inlet port of said upper hopper and providing a seal when said first plug is raised and lowered in said upper hopper by said air motor.

* * * * *